Patented Feb. 22, 1944

2,342,585

UNITED STATES PATENT OFFICE 2,342,585

GRAPHITE RECOVERY

Thomas D. Johnson, Jr., and Richard George Woodbridge, Jr., Wilmington, Del., assignors to E. I. du Pont de Nemours & Company, Wilmington, Del., a corporation of Delaware No Drawing. Application December 11, 1942, Serial No. 468,686

3 Claims. (Cl. 23—109.1)

This invention relates to a method for the recovery of substantially pure graphite from a mixture containing contaminating materials, and more particularly to a method allowing the purification and reuse of excess graphite resulting from the glazing of smokeless powder.

In the manufacture of smokeless rifle powders, one of the operations in the finishing of the powder involves the so-called glazing of the same with a coating of graphite. The function of the glazing treatment is to smooth the rough surfaces of the grains, cause the powder to flow more readily and pack better, and reduce the tendency of the powder to acquire static electric charges.

The satisfactory coating of powder grains with graphite necessitates the use of a considerable excess of this latter material, which is removed later by sieving. The excess graphite thus recovered is not suitable for use in subsequent glazing operations because of the impurities present. The discarding of this dust, however, means a considerable loss of valuable material.

An object of the present invention is a method of recovering graphite in pure form from its mixture with contaminants, such as nitrocellulose and the like. A further object is a method of separating from impurities the graphite present in the excess material recovered after the glazing of smokeless powder grains. A still further object is a method of treating smokeless powder, which comprises coating the grains with finely divided graphite, separating and purifying the excess graphite, and employing the recovered material in further glazing operations. Additional objects will be disclosed as the invention is described more at length hereinafter.

We have found that the foregoing objects are accomplished when we treat the excess graphite, remaining after the coating of the smokeless powder grains and separated therefrom, with a hot solution of a caustic alkali, and preferably with a boiling sodium hydroxide solution. After such treatment for a sufficient length of time, the solution containing the dissolved impurities is separated from the graphite, and the latter is dried and retained for further use, desirably for the coating of subsequent lots of smokeless powder grains, either alone or after mixture with new graphite.

The following example will serve as a specific embodiment of our invention in which the excess graphite remaining after the coating of smokeless powder grains was recovered and purified to a form suitable for use in subsequent coating operations.

Example

Smokeless powder grains were glazed by introduction into a glazing barrel with the proper amount of finely divided graphite and rotation of said barrel for three hours. In the experiment covered by this example, 4000 lbs. of 50-caliber smokeless powder was used and 14 lbs. of graphite. The coated powder was separated from the loose material by passing the latter through a shaker sieve, 8 lbs. of dust being recovered, this dust consisting approximately of 25% nitrocotton, 5% dinitrotoluene, 0.5% diphenylamine, and the remainder graphite. This material was then screened through a 200-mesh bolting cloth, 7 lbs. passing through. These finely divided screenings were boiled for 30 minutes in the form of a 20% slurry in a 5% sodium hydroxide solution. The impurities retained in solution were washed away from the graphite by settling and decantation, eight successive washings in boiling water being given until the supernatant liquid was clear. The recovered graphite was dried and packed for future use.

Graphite thus purified and recovered was found to be satisfactory for use in further glazing of smokeless powder grains. The recovered graphite was mixed with new graphite in a proportion of 1 part to 4 parts of the new graphite. Four thousand pounds of smokeless powder was glazed with 14 lbs. of the mixture of recovered and new graphite. After such treatment, the powder possessed a satisfactory glaze. While the recovered graphite was somewhat lumpy, these lumps broke up shortly after introduction into the tumbling barrel.

The material first removed from the smokeless powder grains after the glazing operation is not suitable for use as a coating for subsequent grains because of the impurities present, such as nitrocellulose in all cases, and compounds such as dinitrotoluene and diphenylamine where these are present as ingredients of the powder, as is the case with many rifle and cannon powders. When treated with hot or boiling sodium hydroxide solution, the nitrocellulose decomposes, as does also the dinitrotoluene, while the diphenylamine is sufficiently small in amount to go into solution. Thus, the graphite alone remains unaffected. We find that the graphite after recovery and drying is in the form of lumps, but that these lumps do not need to be broken up prior to their use in glazing, since the tumbling action there brings about reduction to the desired fineness.

We have emphasized sodium hydroxide as the preferred caustic alkali for use, because of its effectiveness and its availability. It will be understood, however, that potassium hydroxide is equally effective. Likewise, other alkaline solutions may be used, such as those of the water-soluble alkali and alkali-earth carbonates or sulfides, and ammonia. We find a 5% sodium hydroxide solution to be a satisfactory concentration, but may use a strength between 2 and 30%. While we prefer to boil the graphite-containing slurry with the caustic solution, the use of hot solutions generally is intended to be covered. It is not essential that the solutions be boiling, but the action will be more rapid at higher temperatures.

The process of our invention may be applied to any type or composition of smokeless powder where glazing is a desirable step. The graphite used will desirably be in very fine divided form, for example sufficiently fine to pass completely a 200-mesh screen, since such a degree of fineness is frequently specified for graphite for this purpose.

The invention has been described at length in the foregoing. It will be understood, however, that many variations may be introduced in the details of procedure and manipulation without departure from the spirit of the invention. We intend to be limited, therefore, only by the following patent claims.

We claim:

1. The method of purifying graphite which has become contaminated by use in the glazing of smokeless powder, which method comprises treating the graphite-containing material with a hot solution of a caustic alkali having a concentration between 2 and 30%, removing the dissolved impurities, and recovering the purified graphite.

2. The method of purifying graphite contaminated with nitrocellulose, which comprises treating said impure graphite with a boiling solution taken from the group consisting of solutions of ammonia and of the water-soluble hydroxides, carbonates, and sulfides of the alkali and alkali-earth metals and having a concentration between 2 and 30%, removing the dissolved impurities, and recovering the purified graphite.

3. The method of purifying graphite which has become contaminated by use in the glazing of smokeless powder, which method comprises treating the graphite-containing material with a boiling solution of sodium hydroxide having a concentration between 2 and 30%, removing the dissolved impurities, and recovering the purified graphite.

THOMAS D. JOHNSON, Jr.
RICHARD G. WOODBRIDGE, Jr.